(12) United States Patent
Linn et al.

(10) Patent No.: US 12,572,744 B2
(45) Date of Patent: Mar. 10, 2026

(54) GENERATIVE SYSTEMS AND METHODS OF FEATURE EXTRACTION FOR ENHANCING ENTITY RESOLUTION FOR WATCHLIST SCREENING

(71) Applicant: Socure, Inc., Incline Village, NV (US)

(72) Inventors: Joshua Linn, Incline Village, NV (US); Sumit Kumar, Incline Village, NV (US); Yu Zeng, Incline Village, NV (US); Alex Austin, Incline Village, NV (US); Md Yasin Kabir, Incline Village, NV (US); Vignesh Sivakumar, Incline Village, NV (US); Ali Haddad, Incline Village, NV (US); Pablo Ysrrael Abreu, Incline Village, NV (US); Nikita Ganiga, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 18/634,427

(22) Filed: Apr. 12, 2024

(65) Prior Publication Data

US 2025/0322159 A1     Oct. 16, 2025

(51) Int. Cl.
*G06F 40/30*          (2020.01)
*G06F 40/205*         (2020.01)
*G06F 40/284*         (2020.01)

(52) U.S. Cl.
CPC .......... *G06F 40/284* (2020.01); *G06F 40/205* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 9,348,992 B2 *   5/2016   Kassaei ................... G06F 21/41
9,641,528 B2 *   5/2017   Little .................. H04L 63/0853
(Continued)

FOREIGN PATENT DOCUMENTS

EP        4209941 A1 *   7/2023   ............. G06F 21/32
WO     2018215914 A1    11/2018

OTHER PUBLICATIONS

Deng et al., title={An Early Warning Model of Telecommunication Network Fraud Based on User Portrait}, journal={Computers, Materials and Continua}, vol. {75}, No. {1}, pp. {1561--1576}, publisher= {Elsevier}, (Year: 2023).*

(Continued)

*Primary Examiner* — Lamont M Spooner
(74) *Attorney, Agent, or Firm* — Charles B. Lobsenz; Brian H. Buck; Potomac Law Group, PLLC

(57) ABSTRACT

Provided are a method and system for identity correlation between a transaction applicant (TA) and a watchlist entity (WE). Preexisting watchlist data and other aggregated identity data (AID) are processed to provide for comparison to a collective identity of at least the TA. Using various categorizations for the AID and the collective identity, watchlist tags are generated that can then be matched to the collective identity. As a result of the matching, a watchlist candidacy demonstrating a probability that the identity of the TA does or does not correspond to that of the WE can be generated. Natural language processing may be used in connection with sourced textual information such as from news articles, social media posts and the like to supplement the AID available to the system and to further enhance matching functionality.

12 Claims, 15 Drawing Sheets

(56) References Cited

U.S. PATENT DOCUMENTS

| | | | | |
|---|---|---|---|---|
| 9,686,217 | B2* | 6/2017 | Prabhu | H04L 51/212 |
| 10,108,791 | B1 | 10/2018 | Masterman | |
| 10,410,125 | B1* | 9/2019 | Finkelstein | G06N 7/01 |
| 10,410,273 | B1* | 9/2019 | Finkelstein | G06N 7/01 |
| 10,432,605 | B1* | 10/2019 | Lester | H04L 63/08 |
| 10,726,123 | B1 | 7/2020 | Mookiah et al. | |
| 10,733,619 | B1 | 8/2020 | Newman | |
| 10,754,936 | B1 | 8/2020 | Hawes et al. | |
| 10,754,946 | B1 | 8/2020 | Gribelyuk et al. | |
| 10,853,757 | B1 | 12/2020 | Hill et al. | |
| 10,956,916 | B1 | 3/2021 | Abreu et al. | |
| 11,423,365 | B2* | 8/2022 | Fidanza | G06N 3/08 |
| 12,003,956 | B2* | 6/2024 | Naujok | H04L 63/1425 |
| 12,287,856 | B2* | 4/2025 | Osborn | G06F 21/31 |
| 12,287,858 | B2* | 4/2025 | Telford-Reed | H04W 12/126 |
| 2002/0161731 | A1 | 10/2002 | Tayebnejad et al. | |
| 2010/0305946 | A1* | 12/2010 | Gutierrez | G06Q 20/40145 |
| | | | | 704/246 |
| 2011/0016041 | A1 | 1/2011 | Scragg | |
| 2012/0109802 | A1 | 5/2012 | Griffin et al. | |
| 2014/0067656 | A1* | 3/2014 | Cohen Ganor | G06Q 50/01 |
| | | | | 705/39 |
| 2014/0282977 | A1 | 9/2014 | Madhu et al. | |
| 2015/0142595 | A1* | 5/2015 | Acuna-Rohter | G06Q 20/40 |
| | | | | 705/21 |
| 2016/0239920 | A1* | 8/2016 | Cunningham | G06Q 40/08 |
| 2016/0371618 | A1* | 12/2016 | Leidner | G06F 16/2246 |
| 2017/0286671 | A1 | 10/2017 | Chari et al. | |
| 2017/0364917 | A1* | 12/2017 | Karantzis | G06Q 20/384 |
| 2018/0247268 | A1* | 8/2018 | Vanasco | G06Q 50/01 |
| 2018/0337937 | A1 | 11/2018 | Saunders et al. | |
| 2018/0349901 | A1* | 12/2018 | Chen | G06Q 20/34 |
| 2019/0156426 | A1* | 5/2019 | Drucker | G06Q 40/08 |
| 2019/0340610 | A1* | 11/2019 | Song | G06Q 20/4014 |
| 2020/0272741 | A1 | 8/2020 | Bhatia et al. | |
| 2020/0366671 | A1 | 11/2020 | Larson et al. | |
| 2021/0042366 | A1* | 2/2021 | Hicklin | G06N 3/08 |
| 2021/0142329 | A1* | 5/2021 | Aparício | G06N 5/025 |
| 2021/0174347 | A1* | 6/2021 | Rose | H04L 63/0428 |
| 2021/0224922 | A1 | 7/2021 | Juban et al. | |
| 2021/0264437 | A1* | 8/2021 | Flowers | G06N 5/04 |
| 2021/0314331 | A1* | 10/2021 | Singh | H04L 9/0891 |
| 2021/0342842 | A1* | 11/2021 | Gilbey | G06Q 30/018 |
| 2022/0005332 | A1 | 1/2022 | Metzler et al. | |
| 2022/0050838 | A1 | 2/2022 | Piatetsky et al. | |
| 2022/0051255 | A1* | 2/2022 | Abifaker | G06Q 20/4016 |
| 2022/0067775 | A1 | 3/2022 | Rahimi | |
| 2022/0270176 | A1 | 8/2022 | Chintakindi et al. | |
| 2022/0366078 | A1 | 11/2022 | Kirti et al. | |
| 2022/0407863 | A1 | 12/2022 | Hen et al. | |
| 2023/0055106 | A1* | 2/2023 | Kletter | G06Q 20/4014 |
| 2023/0118380 | A1* | 4/2023 | Krosinski | G06Q 20/405 |
| | | | | 705/44 |
| 2023/0134651 | A1* | 5/2023 | Agbamu | G06V 40/172 |
| | | | | 705/325 |
| 2023/0147934 | A1 | 5/2023 | Eddin et al. | |
| 2023/0224324 | A1 | 7/2023 | Karabey et al. | |
| 2023/0245139 | A1* | 8/2023 | Shen | G06Q 30/0185 |
| | | | | 705/318 |
| 2023/0267198 | A1 | 8/2023 | Karpovsky et al. | |
| 2023/0273981 | A1 | 8/2023 | Rapowitz et al. | |
| 2023/0316261 | A1* | 10/2023 | Agbamu | G06N 3/09 |
| | | | | 705/67 |
| 2023/0367821 | A1* | 11/2023 | Hicklin | G06F 16/906 |
| 2023/0376962 | A1* | 11/2023 | Abreu | G06Q 20/389 |
| 2023/0388332 | A1 | 11/2023 | Cunningham et al. | |
| 2024/0062206 | A1* | 2/2024 | Osborn | G06Q 20/353 |
| 2024/0333699 | A1* | 10/2024 | Narendranathan | H04L 63/08 |
| 2024/0394662 | A1* | 11/2024 | Maikhuri | G06Q 10/1053 |

OTHER PUBLICATIONS

Unknown, "Entity Resolution Software," Senzing, www.senzing.com, 2024.

European Search Report issued in application No. EP25160679 dated Apr. 10, 2025.

Han et al., "NextGen AML: Distributed Deep Learning based Language Technologies to Augment Anti Money Laundering Investigation," Proceedings of the 56th Annual Meeting of the Association for Computational Linguistics-System Demonstrations, pp. 37-42, Jul. 2018.

European Search Report issued in application No. EP 25160687 dated Jun. 26, 2025.

European Search Report issued in application No. EP 25160692 dated Jun. 24, 2025.

European Search Report issued in application No. EP 25160696.8 dated Jun. 10, 2025.

Alkhalili et al., "Investigstion of Applying Machine Learning for Watch-List Filtering in Anti-Money Laundering," IEEE Access, vol. 9, pp. 18481-18496, Jan. 2021.

* cited by examiner

START
310

RETRIEVE AGGREGATED
IDENTITY DATA (AID)
320

APPLY NATURAL LANGUAGE
PROCESSING (NLP) TO AID
330

RETAIN NLP-PROCESSED AID IN AID BASE
340

END
350

| | 1310 |
| | 1320 |
| | 1330 |
| | 1340 |
| | 1350 |

GENERATIVE SYSTEMS AND METHODS OF FEATURE EXTRACTION FOR ENHANCING ENTITY RESOLUTION FOR WATCHLIST SCREENING

FIELD OF THE DISCLOSURE

Disclosed embodiments relate to identity correlation associated with watchlists, and more specifically, to correlation of an identity to a watchlist identity using natural language processing of externally sourced data.

BACKGROUND

A "watchlist" is ordinarily regarded as a listing of individuals (aka "watchlist entities "WEs") who, because of various suspicion(s) associated with past activity, are identified as having a propensity to be malevolent actors. When considering other candidate individuals (herein "transaction applicants" (TAs)) who, it may turn out, may or may not matches for WEs, identification thereof can be of great societal benefit in thwarting crime or potential engagement in crime.

Traditional manner of such identification is mainly reliant on review of widely circulated watchlists, whether the circulation is provided by government or private entities. That review, all too often, is manual in nature, meaning that persons employed by those entities must grapple with, for instance, comparison of enormous amounts of ever-changing listing and delisting of WEs. Due to what can be an overwhelming burden in conducting such manual review, various types of error can be introduced leading to missed or incorrect watchlist identifications. For instance, error can arise from inappropriate comparison for names provided on a watchlist and/or associated with candidate individuals due to, simply or not so simply, volume of name listings, name misspellings, a variety of incorrect or inadequate personally identifiable information (PII), lack of consideration of aliases, etc. Circumventing watchlist misidentification, i.e., otherwise confirming watchlist candidacy, in the face of these and other types of error is crucial to the integrity of intended transactions, whether they be in the private or public sector.

Another limitation of existing approaches for attempting to match TAs as against WEs relates to constraints on available data sources. In traditional approaches, it is typical to only source data from known data sources identified as providing traditional watchlist databases. In today's environment, there are many additional sources of data regarding individuals aside from these traditional, special purposed watchlist databases. For example, social media postings and news articles can provide additional and valuable data regarding individuals and their propensities for engaging in activities that might disqualify them from engaging in certain financial transactions and/or other online or offline activities.

The issue with the use of this externally sourced data is that it is largely unstructured, inconsistent in formatting and it typically takes human intervention to assess the content of the data (e.g. in a social media posting or in a news article relating to a specific individual) to determine whether it is relevant to that individual, whether it is relevant to decision making with respect to that individual seeking to process a transaction and, if relevant, in what way (e.g. a factor in disqualification, etc.). Because of the difficulty in normalizing the data extracted from these external sources as well as determining relevance, traditional decision making systems have not employed data from these external sources notwithstanding that it can be a valuable source of data enabling more accurate and effective decision making.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system regarding determining watchlist candidacy, including receiving identity characteristics corresponding to a transaction applicant (TA), receiving identity characteristics corresponding to a watchlist entity (WE), and receiving one or more aggregated identity data (AID) corresponding to one or more of the TA and the WE. Extensive feature engineering around name, address, historical data is performed to maximize model accuracy. The method and system may further include determining for one or more of (a) the identity characteristics corresponding to a TA and (b) the identity characteristics corresponding to a WE, a respective collective identity of at least the TA, wherein the respective collective identities of the TA and WE are determined with respect to the AID. Additionally, the method and system may include converting at least the collective identity of the TA into first input for a first machine learning model, applying the first input to the first machine learning model and, in response, obtaining one or more watchlist tags, converting the watchlist tags into second input for a second machine learning model, and then applying the first input and the second input to at least the second machine learning model and, in response, obtaining a watchlist candidacy for the TA.

Additional embodiments may include methodologies and systems wherein external data sources such as news articles, social media postings and other sources of available information concerning individuals is sourced and used in connection with making determinations as to whether a TA should be permitted to proceed with a proposed transaction. The methodologies and systems may further include the use of natural language processing techniques as well as machine learning and artificial intelligence to capture and process information extracted from these external data sources such that they can generate or supplement a collective identity which is used by one or more system models in connection with watchlist matching efforts including, for example, assessing whether a TA is a likely match to one or more records associated with individuals and available in an aggregated identity database, and if so, determining what action should be taken connection with a proposed transaction sought by the TA.

In these regards, and as will be appreciated from the discussion(s) below, extensive feature engineering relative to one or more identity characteristics (e.g., name, address, historical data such as age) may be performed according to one or more aspects of the modeling herein to improve accuracy for a determination of watchlist candidacy of a TA with respect to a WE.

BRIEF DESCRIPTION OF THE DRAWINGS

FIG. 13 illustrates a number of exemplary snippets from news articles and the labelling thereof in connection with feature extraction of textual content according to embodiments herein; and FIG. 14 illustrates a table demonstrating the matching of identities and related outcomes associated therewith according to embodiments herein.

DETAILED DESCRIPTION

Figure 1:
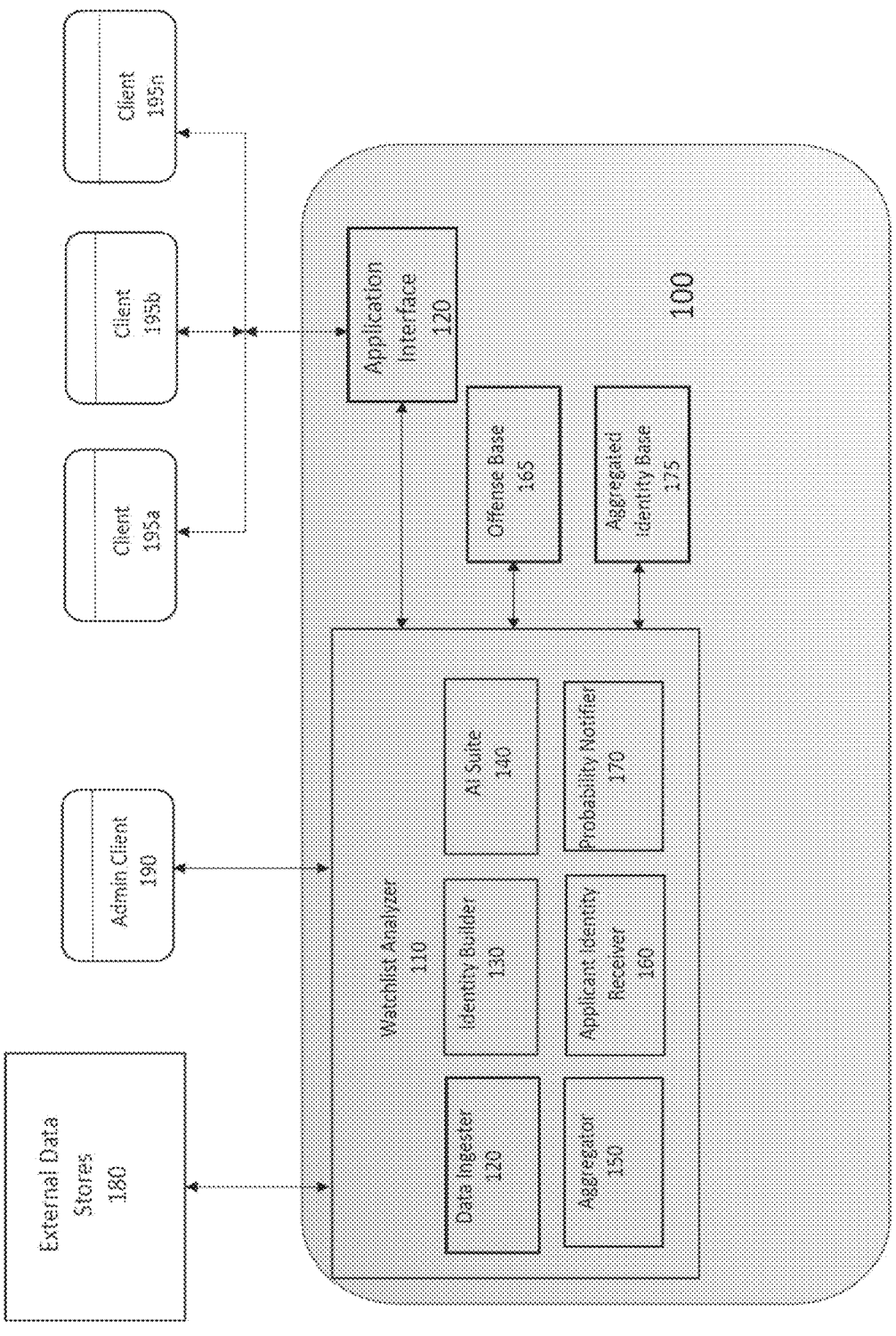
FIG. 1 illustrates elements of a Watchlist Comparison System (WCS) enabling inspection of a watchlist for an identity, according to embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to identity correlations in connection with proposed transactions initiated by transaction applicants (TAs) and through the use of data sourced from watchlists as well as external sources of data such as news articles and social media postings and related content. In this regard, assessments as to whether the true identity of the TA matches one or more aggregated identities constructed by the system herein can be made wherein these aggregated identities may include information garnered from public or private sector activities, such as, to name a few, travel regulation and enforcement, employment eligibility, financial transaction eligibility, eligibility for social media participation, social media postings, news articles, images and various other types of content and data.

Inspection for any such correlations or the absence thereof can be conducted in real time as additional data sources become available and/or as they are periodically updated. As can be appreciated, the ingesting and processing of such data can be extremely difficult if not impossible to implement given the disparate sources of data as well as the sheer volume of data that needs to be processed and applied. As will be understood from the descriptions herein, the present embodiments apply machine learning and AI techniques and methodologies in order to construct a large number of individual aggregated identities which are tested against collective identities associated with TAs to determine the likelihood/probability of a match between the TA and an aggregated identity which is deemed to be a high risk in the context of the proposed transaction.

The probability (i.e., a watchlist candidacy) can be informed, for instance, based on combinations of information not considered by traditional watchlist review, such as social media presence and participation, publicly available documents such those administered by governmental entities, privately-held PII databases, and/or various publications (e.g., newspaper articles mentioning the TA, TA-authored writings, or TA curriculum vitae). In contrast with existing identity matching approaches which rely primarily on demographic factors, the present embodiments are distinguished by, at least, use of unsupervised semantic identity modeling along with graph-based clustering to associate identities with only minimal explicit attribute comparisons. In this way, the present embodiments can build holistic identity profiles combining both personal and network-ascertained contextual data. Determination of the probability in this way will be understood to, at least because of the continual nature of change of watchlist data and volume of TAs that can be assessed simultaneously in real time, be beyond the reach of calculations that could be reasonably performed in the human mind in a timely and accurate manner.

Modeling, as discussed herein, is measured in terms of accuracy, precision, recall and Area Under the Curve (AUC) metrics. Models can, optionally, be retrained frequently on an augmented dataset containing all new labeled identities received through human review feedback. In these instances, retraining evaluates model degradation via accuracy metrics on a selected one or more test sets. Evaluation results indicating significant degradation can trigger human-in-the-loop analysis and model architecture improvements to restore baseline metrics. To promote fairness and transparency, model training incorporates techniques such as adversarial debiasing along gender and racial attributes. Match decisions, for identities, include highest weighted factors to enable explainability around triggers that can be reasons for a match decision. In these regards, an ethics review committee can evaluate model implementations and behaviors at least annually to, for instance, ensure the aforementioned debiasing.

In some embodiments as are disclosed herein, natural language processing is employed to parse and process various textual content in order to generate aggregated identities stored in a database which also include information sourced from traditional watchlists. This enables the system according to embodiments herein to make comparisons of collective identities generated from input data provided by a TA as against aggregated identities developed by the system herein prior to the time that the transaction request is submitted. The determinations and the end results resulting therefrom may be provided to the system as feedback which enables the system herein to enhance its ability to make future recommendations regarding the probability of a TA identity being an individual tagged as not being a good risk for the proposed transaction. In addition, the system according to the embodiments herein may weight specific factors at different levels in connection with determination of probabilities provided in response to transaction requests. For example, certain predicate offenses associated with past financial matters may be immediately disqualifying.

Referring to FIG. 1, there is illustrated a Watchlist Comparison System (WCS) 100 according to one or more embodiments herein. WCS 100 may reside on a single cloud based server although it is also possible for various components of WCS 100 (as described herein) to reside on separate servers. By way of example, WCS 100 may be a computer implemented application which resides on a computing server. As will be apparent from the discussion herein, WCS 100 may include and/or implement all appropriate software (i.e., algorithms) and/or hardware (i.e., storage, processors) for carrying out its applicable identity correlation and related capabilities.

WCS 100 preferably includes Watchlist Analyzer 110, which itself is comprised of a number of modules as discussed further herein. Watchlist Analyzer 110 operates to detect patterning of identity data (and other data as discussed herein) that can be inspected for correlation to one or more collective identities associated with a TA. These detections are generated in response to requests originating from clients 195a, 195b . . . 195n. WCS 100 may be accessed through the internet or any other private or public network by one or more clients 195.

Each of clients 195 may be personal computers, laptops, handheld computing devices such as smartphones or tablets or any other device capable of providing the required connectivity and display. In some embodiments, a client 195 may be a computing application operated by a customer subscribed to WCS 100 which requires identity correlation data to process transaction requests. For example, client 195 may be an application or set of applications operated by a financial institution which processes requests for new credit cards made by customers of that financial institution. Herein, the terms "transaction," and "transaction request" can mean any event for which identity can be detected via analysis and scoring of information used in connection with the event, and include, for example, an application for a business or other type of account opening, an application providing an account information update, an application for a credit check, any type of application for a background check or identity verification, an application for an employment check or verification, etc. That is, the subject information for which identity may be detected can be information submitted during an initial stage (i.e., application stage) of an activity toward which an application is directed (e.g., account opening, employment, etc.).

In these regards, for instance, it is contemplated that embodiments herein may be employed to detect correlation of a collective identity associated with a TA on the one hand, to one or more data records associated with an aggregated identity developed by WCS 100, including that of a WE. For example, it is contemplated that embodiments herein can detect correlation for information submitted as part of any of the aforementioned applications such that the activity toward which an application is directed (e.g., an account opening) ought not to proceed.

Clients 195 interact with WCS 100 such that data may be communicated between them via application interface 120 and such that WCS 100 may process identity correlation requests made by clients 195 with regard to one or more of the above types of applications made by individuals or entities such as organizations. Application interface 120 may comprise one or more application programming interfaces (APIs) that permit applications associated with clients 195 to communicate with WCS 100.

Also shown in FIG. 1 is admin client 190. Admin client 190 may comprise a personal computers, laptops, handheld computing devices such as smartphones or tablets or any other similar device. Admin client 190 is operative to allow users to configure, maintain and support the operation of WCS 100. For example, a user may use admin client 190 to interact with WCS 100 to set parameters regarding what is required to invoke the correlations between a collective identity associated with a TA and one or more records contained in an aggregated identity database as discussed in further detail below.

External data stores 180 may also be present according to the teachings of one or more embodiments herein. External data stores 180 may comprise one or more external databases, data sets, systems, applications, rules bases and/or other sources of data which are used by WCS 100 to develop aggregated identities as further described herein. By way of example, external data stores 180 may comprise watchlist data sources, credit reporting databases, public and/or private demographic databases, reported and known fraud data, financial transaction data, social media data, articles and publications, social media platform content, public licensing databases as well as other sources of data useful to WCS 100 in developing aggregated identities as more fully described herein.

Returning now to the specific components of WCS 100, WCS 100 may include various components for correlating a collective identity associated with a TA to one or more aggregated identities. In these regards, it will be understood that correlation of the TA collective identity may be to one or more aggregated identity records developed by WCS 100 using data available from external data stores 180 such that, as will be understood from the discussions herein, a probability of a match for the TA as against an aggregated identity record may be discerned. Based on the attributes associated with the matched aggregated identity, a recommendation as to whether the proposed transaction may be allowed to proceed may also be provided.

WCS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to WCS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 195, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of WCS 100 shown in FIG. 1, Watchlist Analyzer (hereinafter "WA 110") includes various components which are described hereinbelow. Operation(s) of each of these WA 110 components will be described in further detail below with reference to FIG. 2.

In one or more embodiments, WA 110 can include a data ingester 120, an identity builder 130, an artificial intelligence (AI) suite 140, an aggregator 150, an applicant identity receiver 160, and a probability notifier 170. One or more of these components can, via operation of the WCS 100, be cooperable with a constituent offense base 165 and an aggregated identity base 175 for purposes described herein.

More specifically, data ingester 120 can be cooperable with external data stores 180 to retrieve, for example, myriad watchlist data, social media data, articles and news stories associated with individuals, privately held identity data, geolocation data, publications such as books, curriculum vitae, newspapers, and other identity data for an individual such as arrest records, court documents, tax records, licensing data, etc.

Identity builder 130 can be cooperable with AI suite 140 to, for example, process data retrieved by data ingester 120 to recognize and resolve errors in ingested data. In these regards, the types of errors may be manifested by name misspellings or reversals, incompleteness in PII, duplicate name listing, etc. One or more instances of natural language processing (NLP), unsupervised and/or supervised machine learning may be implemented to resolve the errors. Still further, AI suite 140, may be configured to, in one or more embodiments and in accordance with data ingested by data ingester 120 and retrieved by identity builder 130, implement NLP to determine various characteristics for the data. For example, such a characteristic can be a sentiment (i.e., positive or negative) of an ingested news article. Should the sentiment be determined as being negative, identity builder 130 can operate to ascertain, for instance, whether the sentiment is associated with a financial crime, and if so, whether such financial crime correlates to a recognized predicate offense categorized by entities such as the Financial Action Task Force (FATF) on Money Laundering and catalogued in offense base 165. Based on any determination that the correlation exists, identity builder 130 can then extract entities mentioned in the news article. These and other capabilities of identity builder 130 are discussed in more detail in connection with FIGS. 2 and 12.

In some embodiments disclosed herein, listed WEs and extracted entity information from other data sources available through external data stores 180 may be combined to create and/or supplement aggregate identities which may be stored in aggregated identity base 175. This is implemented by aggregator 150 which may, in some cases, correlate ingested data to a predicate offense, in which case aggregator 150 may then forward that data to aggregated identity base 175, where it can be included in a record contained in aggregated identity base 175 and tagged as an identity associated with a predicate offense. In such case, when a TA collective identity is matched against that record and there is a high probability of a match, the transaction may be recommended to not proceed.

In connection with one or more of data continually ingested by data ingester 120, retrieved at applicant identity receiver 160, and stored in aggregated identity base 175, AI suite 140 can implement one or more iterations of unsupervised machine learning to derive watchlist tags which can be one or more combinations of data inspected by WCS 100, and stored in aggregated identity base 175. Additionally, AI suite 140, in use of such watchlist tags, can further implement one or more iterations of supervised machine learning to ascertain a watchlist candidacy for a TA, i.e., an applicant whose identity has been received via a client 195. Such a candidacy can be expressed as a probability that the identity of the TA collective identity matches that of an aggregated identity generated by the system of one or more of the present embodiments, (i.e., a correlation score), with increasing percentage in the probability indicating it is more likely than not that a match exists. For instance, the probability of 0.22 would be indicative that a match is unlikely as opposed to a probability of 0.95 indicating a match is virtually certain. Once ascertained, probability notifier 170 can report the probability together with reason codes (e.g., different age, different middle initial) to a requester implementing a client 195.

In these ways and through the apparatuses discussed above, WCS 100 can, for a request submitted by a subscriber to WCS 100, gauge and report the likelihood that an applicant of the subscriber embodying a TA is or is not a match for an aggregated identity derived from WE data as well as other data as more fully described herein.

Figure 2:
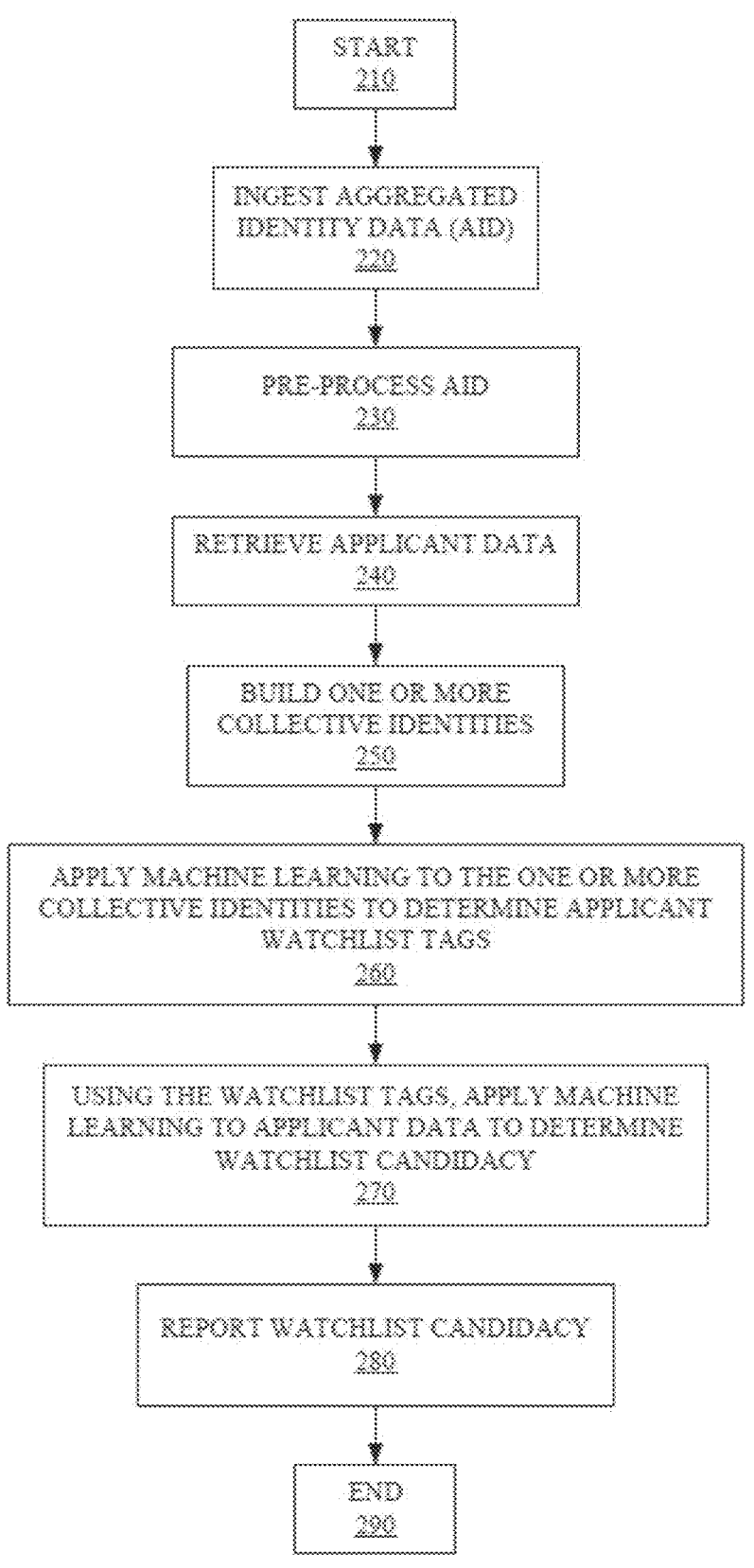
FIG. 2 illustrates a high-level flow diagram of a process of correlating an identity relative to a watchlist to determine watchlist candidacy, according to embodiments herein.

In referring to FIG. 2, there is shown a process implemented by WCS 100 when determining a watchlist candidacy for a TA that can be an applicant in one or more of a public and private sector transaction. The process can begin at 210 and be implemented whenever such a transaction is proposed by either the entity operating a client 195 or the TA.

At 220, WCS 100 can ingest aggregated identity data (AID) from, for example, external data stores 180 of FIG. 1. Here, the AID can include, for example, myriad watchlist data, social media data, privately held identity data, geolocation data, publications such as books, curriculum vitae, newspapers, and other identity data for an individual such as arrest records, court documents, tax records, licensing data, etc. In some implementations, the ingestion can be continual such that as watchlists and/or other data sources are updated, those updates are received and processed by WCS 100. In some implementations, the ingestion can be targeted such that only data having one or more PII corresponding to a TA's input identity can be retrieved via the ingestion.

At 230, WCS 100 can pre-process the AID ahead of receiving a TA's identity characteristics. For instance, ingested watchlist data having name misspelling, reversal (first, last, etc.) can be processed by the WCS 100 using NLP to correct the subject error. Where the AID includes other publicly available information such news articles, for example, WCS 100 can determine a sentiment of an article, i.e., its polarity, via, for example, one or more Support Vector Machines (SVM) and if the same is negative and involves a financial crime that is mappable to a predicate offense via, for example, Decision Trees, WCS 100 can implement NLP to capture contextual meaning and learn complex language patterns via artificial neural networks and transformers. WCS 100 can extract entities via transformer models and assign, via, for example, a Hidden Markov Model (HMM) and a Large Language Model (LLM), their roles according to the context of the article. Frameworks such as PyTorch, Keras, and TensorFlow can be incorporated to provide tools including layers, optimizers, and automatic differentiation to help implement and train one or more the models. This process is discussed in further detail in connection with FIGS. 12, 13 and 14.

At 240, WCS 100 can retrieve applicant data corresponding to a TA. Here, such data can include identity characteristics such as first and last name, date of birth (DOB), residence address, social security number, email address, phone number, crypto handle, national id., etc. Using these characteristics, WCS 100 can, at 250 and as is detailed with reference to discussion hereinbelow, build one or more collective identities for the TA that can contextualize an identity received from the TA so as to, for example, resolve falsehoods, expand upon, and/or uncover one or more identity characteristics provided by a TA during the applicant data retrieval. For instance, such contextualization may be derived from the ingested AID that can include, for example, myriad watchlist data, social media data, privately held identity data, geolocation data, publications such as books, curriculum vitae, newspapers, and other identity data for an individual such as arrest records, court documents, tax records, licensing data, etc.

At 260, WCS 100 uses the one or more collective identities of the TA to determine watchlist tags, (i.e., one or more traits and identity characteristics that, when compared to aggregated identities already generated by WCS 100, are "shared" with a WE such that the commonality is based on one or more same TA and aggregated identity characteristics). In determining the watchlist tags, WCS 100 can initially employ unsupervised learning (e.g., k-means, HMM, Apriori) to cluster and associate identity characteristics received from the TA into TA identity groupings. Here, WCS 100 can further employ a long short-term memory (LSTM) algorithm on the groupings to achieve further refinement and classification for the groupings.

At 270, WCS 100 can, using the LSTM refined identity groupings for the TA, determine a watchlist candidacy as a probability that the TA matches an aggregated identity. In doing so, WCS 100 is configured to employ one or more machine learning models to achieve the candidacy and reason codes for the candidacy in which the models are trained using supervised learning. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

At 280, and prior to ending processing at 290, WCS 100 can report the matching probability (between collective TA identity and one or more aggregated identities) together with accompanying reason codes to a requester implementing, for example, client 195. In some embodiments, WCS 100 can retrieve feedback from the requester as to whether the predicted probability and/or reason code(s) are appropriate and use the feedback to improve design for modeling at 270.

Figure 3:
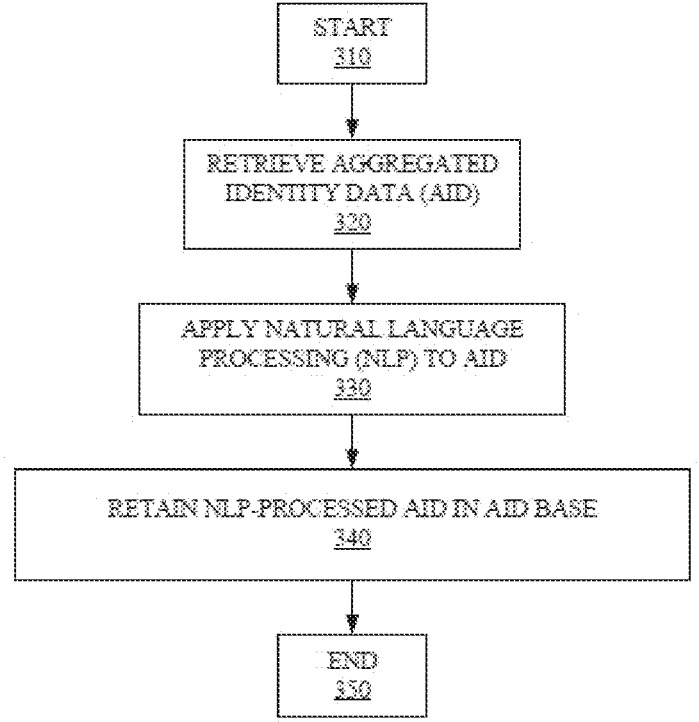
FIG. 3 illustrates a flow diagram of a process for pre-processing one or more aspects of a watchlist and various forms of aggregated identity data (AID), according to embodiments herein.

In referring to FIG. 3, there is illustrated a process undertaken by WCS 100 at 310 to pre-process watchlist and other aggregated identity data (AID). Here, such watchlist data and AID can be retrieved, at 320, through ingester 120 (see FIG. 1) continually throughout operation of WCS 100, or alternatively, such receipt can be triggered in accordance with receipt of TA identity characteristics. Upon receipt, WCS 100 can, as has been discussed, conduct processing to include rectification of various data error (spelling, reversals, etc.), and sentiment analysis in connection with various third party sources of textual content. In some embodiments, the processing can include extraction of imaging of entities, coreference for an entity, entity classification (i.e., role), predicate offense classification, and normalization of data. At 330, WCS 100 can apply NLP to the various AID in textual form to discern characteristics such as sentiment, predicate offense classification, role, etc. Further discussion of the application of NLP is provided below with respect to FIGS. 9 and 12. At 340 and prior to ending a pre-processing stage for watchlist data and AID, processed data (also referenced herein as aggregate identity data) can be retained in AID base 175 (see FIG. 1).

Relative to building a collective identity for a TA as discussed above, FIGS. 4-6 illustrate, respectively, intake of a TA's identity characteristics, construction of a corresponding collective identity, and resolution of that identity based on, for instance, AID processed according to FIG. 3.

Figure 4:
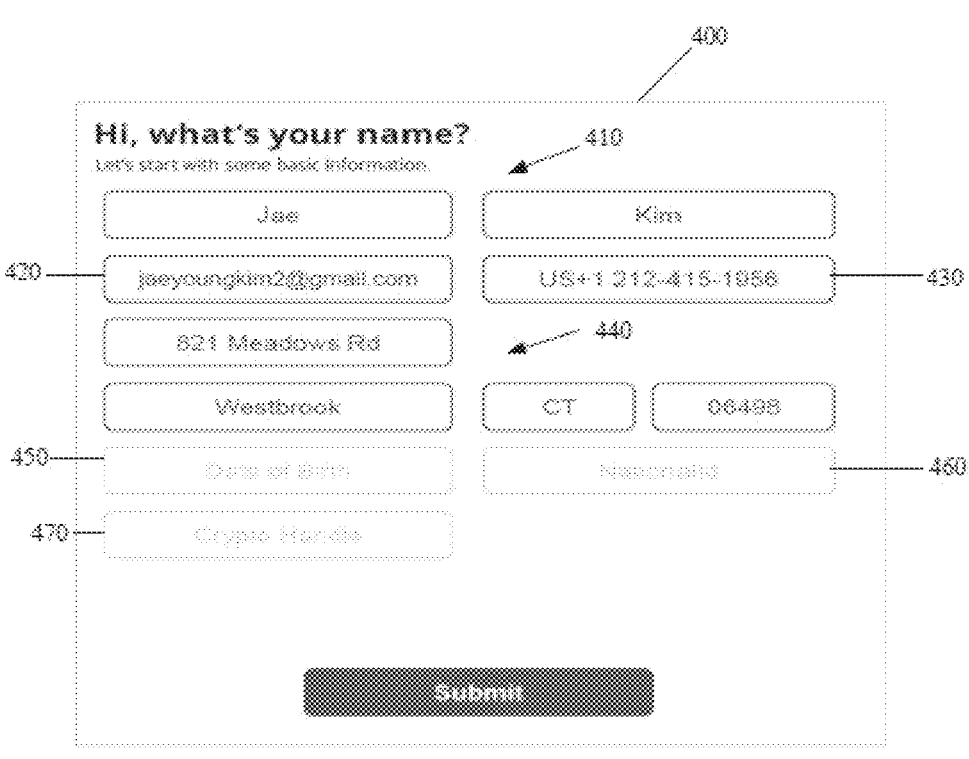
FIG. 4 illustrates a conceptual diagram of an interface for receipt of one or more identity characteristics, according to embodiments herein.

Thus, in referring to FIG. 4, there is shown a typical interface 400 administered through, for instance, a client 195, in which a TA may enter various identity characteristics, including name 410, email address 420, phone number 430, address 440, DOB 450, national id 460, and crypto handle 470.

Figure 5:
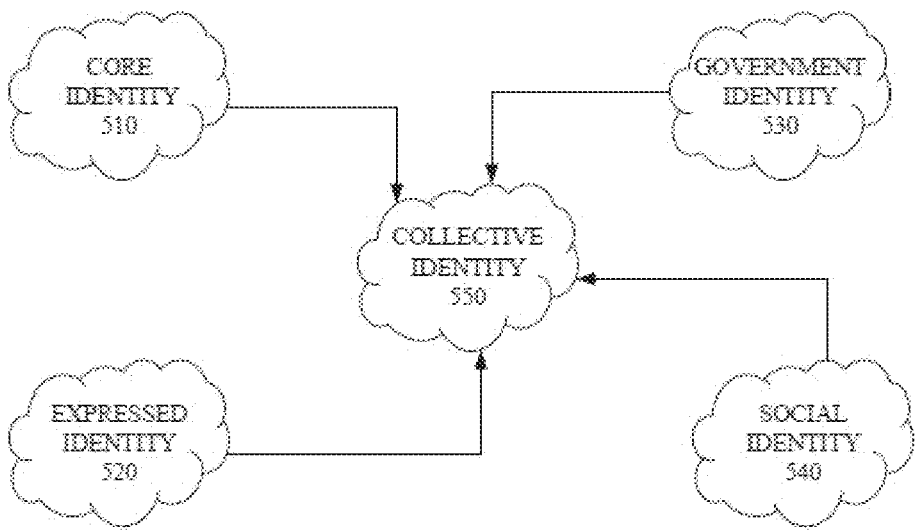
FIG. 5 illustrates a conceptual diagram of a process of building a collective identity for identity characteristics received according to FIG. 4, according to embodiments herein.

Using the identity characteristics obtained via the interface of FIG. 4, WCS 100 can, as is illustrated in FIG. 5, build a collective identity that serves to supplement the identity characteristics and add context to the TA identity characteristics already provided. In this way, WCS 100 can uncover an identity footprint for the TA that may serve to verify the provided identity characteristics, reveal falsity thereof, or supplement the TA identity. Examples of the various identities that can used to develop that footprint, and serve to build such a collective identity, are shown in FIG. 5, and include a core identity 510, an expressed identity 520, a government identity 530, and a social identity 540 some or all of which may contribute to a collective identity 550 derived by WCS 100. In these regards, each of the identities can, with respect to the TA identity characteristics already provided, be derived from continual ingestion and inspection of watchlist data and AID and/or when WCS 100 undertakes to inspect already processed watchlist data and AID gathered in aggregated identity base 175.

More particularly, core identity characteristics 510 can include, for example, name, DOB, gender, place of birth, nationality, ethnicity, facial imaging, and biometric data. Expressed identity characteristics 520 can include, for instance, any nickname, identity manipulation (e.g., name truncation or other alteration), cultural or group affiliation, languages spoken, travel history, behavioral patterns (e.g., work and/or social scheduling). A non-exhaustive listing of identity characteristics that can define a government identity 530 can include national identification, passport and licensing information, citizenship and any changes thereto, civil and/or criminal records, and immigration status. Social identity characteristics may be exemplified by email address, phone number, residence address, IP address, computing device identifiers, social media subscription and participation, crypto handle, socio-political affiliation, employment history (including position(s)), social connection (e.g., family, friends, associates), ancestry, and political engagement.

As will be evident from inspection for the above identities leading to construction of the collective identity 550, it will be appreciated that, for any one identity, WCS 100 can discern certain explicit identity features, such as name, DOB, etc. Additionally, WCS 100 can discern certain auxiliary identity characteristics based on ingested watchlist data and/or AID. A first type of these auxiliary characteristics includes implicit identity features determined by the WCS 100 implementing NLR on certain AID (e.g., news articles) to discern, for example, name etymology and/or age at time of publication of a news article. A second type of auxiliary characteristics includes, with respect to identity characteristics for a TA, features that may be resolved from intake and processing of identity characteristics aimed at determining identity verification. For a more detailed discussion of the aforementioned second type of auxiliary characteristics and their related usage, see commonly owned U.S. Pat. No. 10,956,916, entitled, "Self Learning Machine Learning Pipeline for Enabling Identity Verification," issued on Mar. 23, 2021, and U.S. Patent Application Publication No. 2023/0230088, entitled "Method and System of Predictive Document Verification and Machine Learning Therefor," each of which is incorporated by reference herein in its entirety.

A third type of auxiliary characteristics may include any type of financial crime data that may be implicated by the identity characteristics that are retrieved for the TA. In regard to the numerous types of inspection described above, it is to be understood that the WCS 100 may continually, in real time, cross-reference one or more types of inspected data to ensure alignment of the collective identity 550. For instance, WCS 100 may inspect and verify whether an implicitly derived age of an actor from an item of AID accurately corresponds to an age verified according to government records where such an actor is the TA. Likewise, WCS 100 may inspect whether geolocation data of a device used for social media participation corresponds with sufficient regularity to suggest that the data indicates a residence address for a TA as reported on a government issued form of identification. Thus, for these and other types of inspections of TA identity characteristics for processed watchlist data and processed AID, WCS 100 can resolve the TA's identity to uncover further TA identity characteristics.

Figure 6:
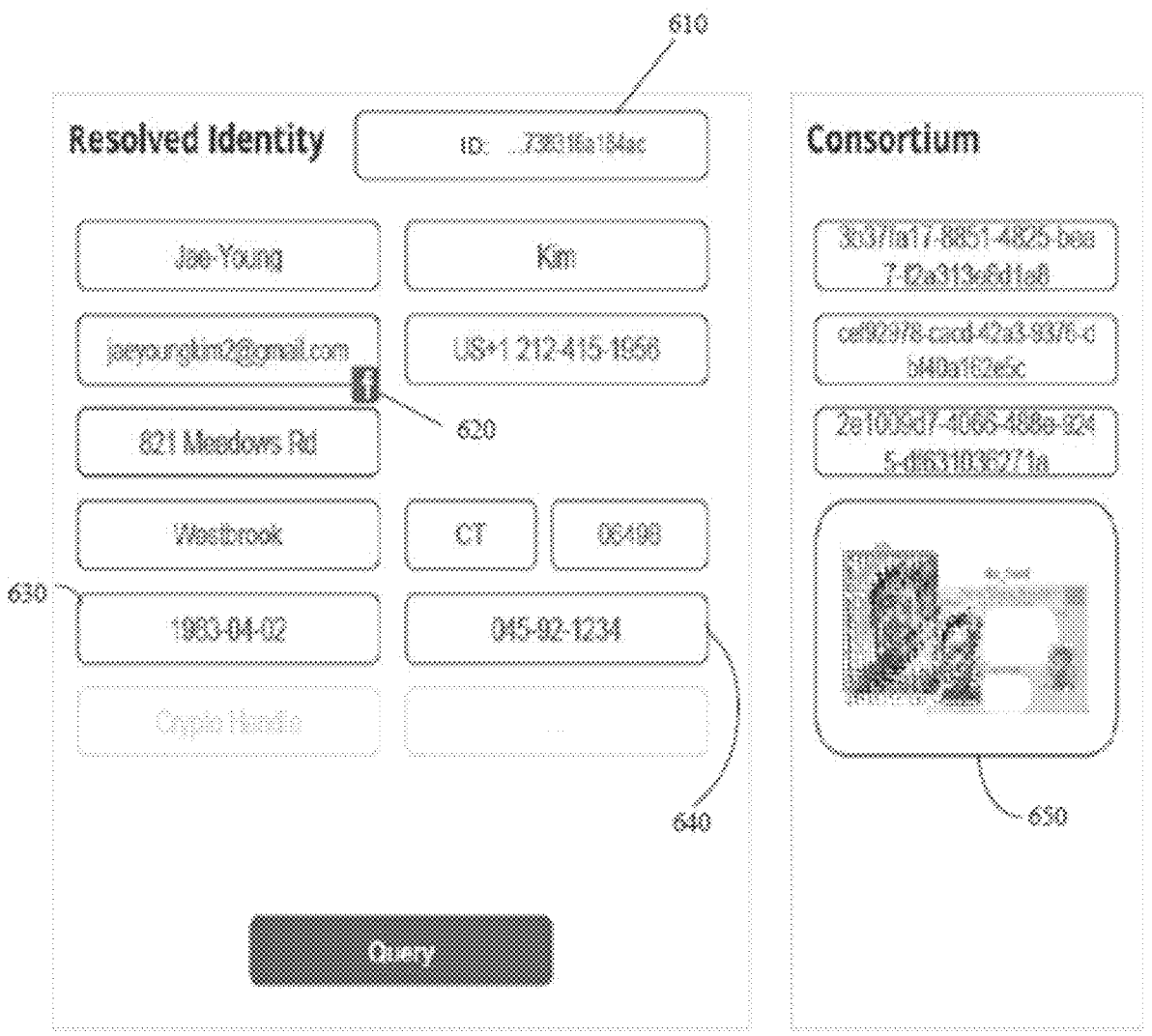
FIG. 6 illustrates a conceptual diagram of an interface demonstrating resolution for a collective identity determined according to FIG. 5, according to embodiments herein.

In referring to FIG. 6, there is shown an exemplary interface displaying such further TA characteristics that the above-discussed inspections can reveal using identity characteristics supplied by the TA as in FIG. 4. For instance, for a resolved identity assigned a unique identifier 610, WCS 100 can reveal social media participation 620, as well as DOB 630 and social security number 640. Additionally, one or more of these further identity characteristics in combination with those supplied by the TA in FIG. 4 can reveal facial imaging 650.

While discussion thus far has provided that the WCS 100 can build a collective identity for a TA, so, too, can an aggregated identity be built by WCS 100 for a known WE. In this regard, the aggregated identity can be built in the same manner as that of a TA since placement on a watchlist and AID implicating the WE can be similarly inspected by WCS 100. In one or more embodiments, aggregated identities are stored in AID base 175 as a set of records represented as rows in a table each with a record indicator. Each of these records, in turn, contains one or more features associated with the specific identity record such as the DOB, address, image data, applicable predicate offenses, etc. associated with the specific identity contained in the AID base 175. WCS 100 can build any such aggregated identity for any entity revealed by AID that has been ingested. As such, any aggregated identity corresponding to a WE or AID revealed entity can be stored in aggregated identity base 175 (see FIG. 1).

Figure 7:
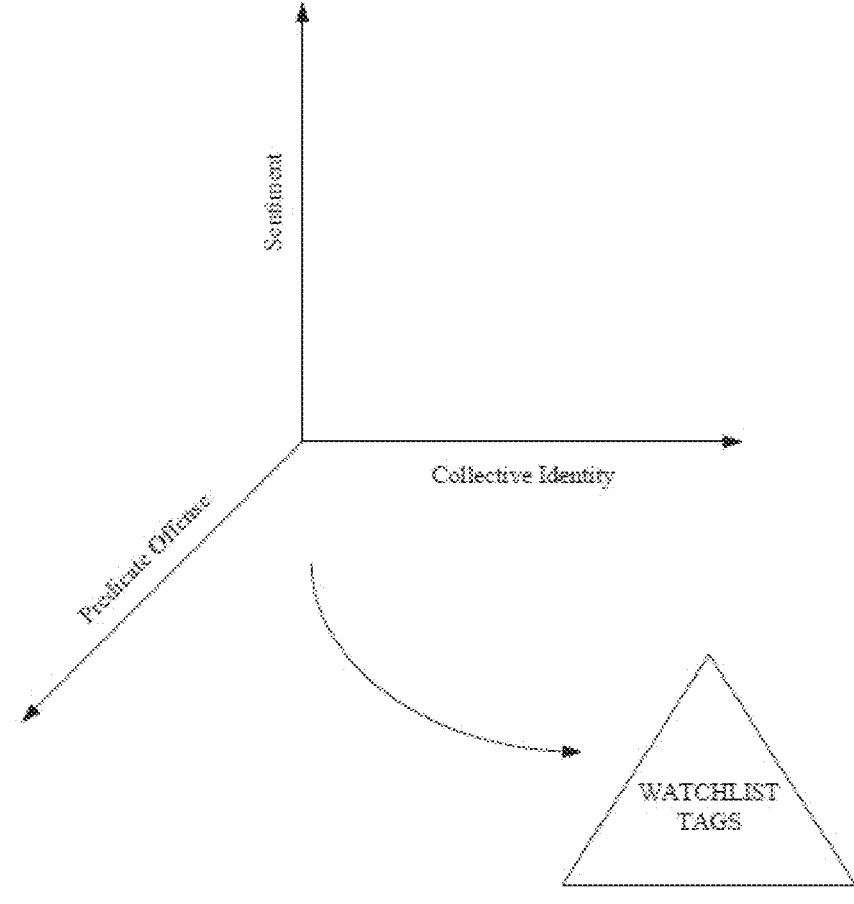
FIG. 7 illustrates a conceptual diagram of organization, for a collective identity, of aggregated identity data (AID), according to embodiments herein.

In these regards and when referring to FIG. 7, there is illustrated, for a collective identity of a WE or other AID revealed entity, the conceptual application of unsupervised learning together with LSTM modeling to form watchlist tags that may be used in determining watchlist candidacy for a TA. For example, based on appearance of a given entity's name in an item of AID having negative sentiment that is mappable to a predicate offense, such a collective identity can be discerned by WCS 100 to correspond to watchlist tags including, for example: middle-aged, male, surname Kim, human trafficking, Westbrook.

Figure 8:
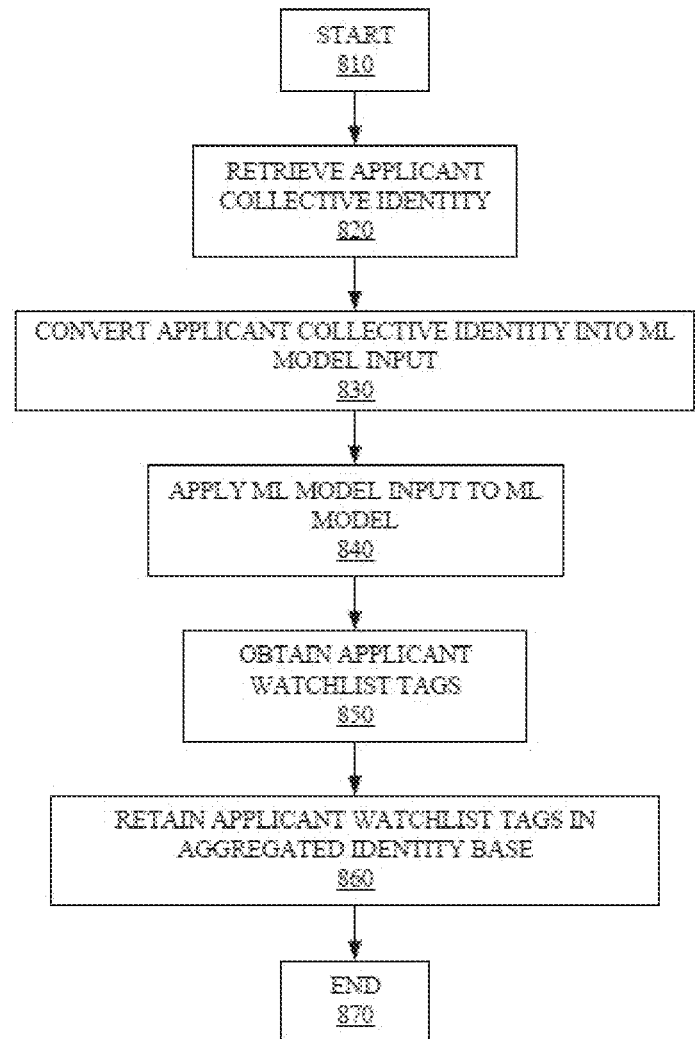
FIG. 8 illustrates a flow diagram for determining watchlist tags for a collective identity, according to embodiments herein.

Referring to FIG. 8, there is illustrated a process for determining watchlist tags with respect to a collective identity built for a TA. The process can begin at 810 and proceed to 820 whereat the WCS 100 can retrieve the collective identity of a TA. At 830, WCS 100 can convert the TA's collective identity into a machine learning (ML) model input. For example, an unsupervised machine learning model (e.g., k-means, HMM, Apriori) can be configured to receive a sparse vector with vector slots filled by characteristics for the collective identity of the TA. Values for the vector can be representative of the types of characteristics. At 840, WCS 100 can apply the input to the unsupervised model and additionally implement one or more LSTM algorithms on the model output to refine (i.e., classify commonality with WE identity characteristics) the same such that TA tags are obtained at 850. Once obtained, the tags can, prior to operations ending at 870, be retained at 860 in aggregated identity base 175 of FIG. 1 or in some other storage location accessible by WCS 100.

Figure 9:
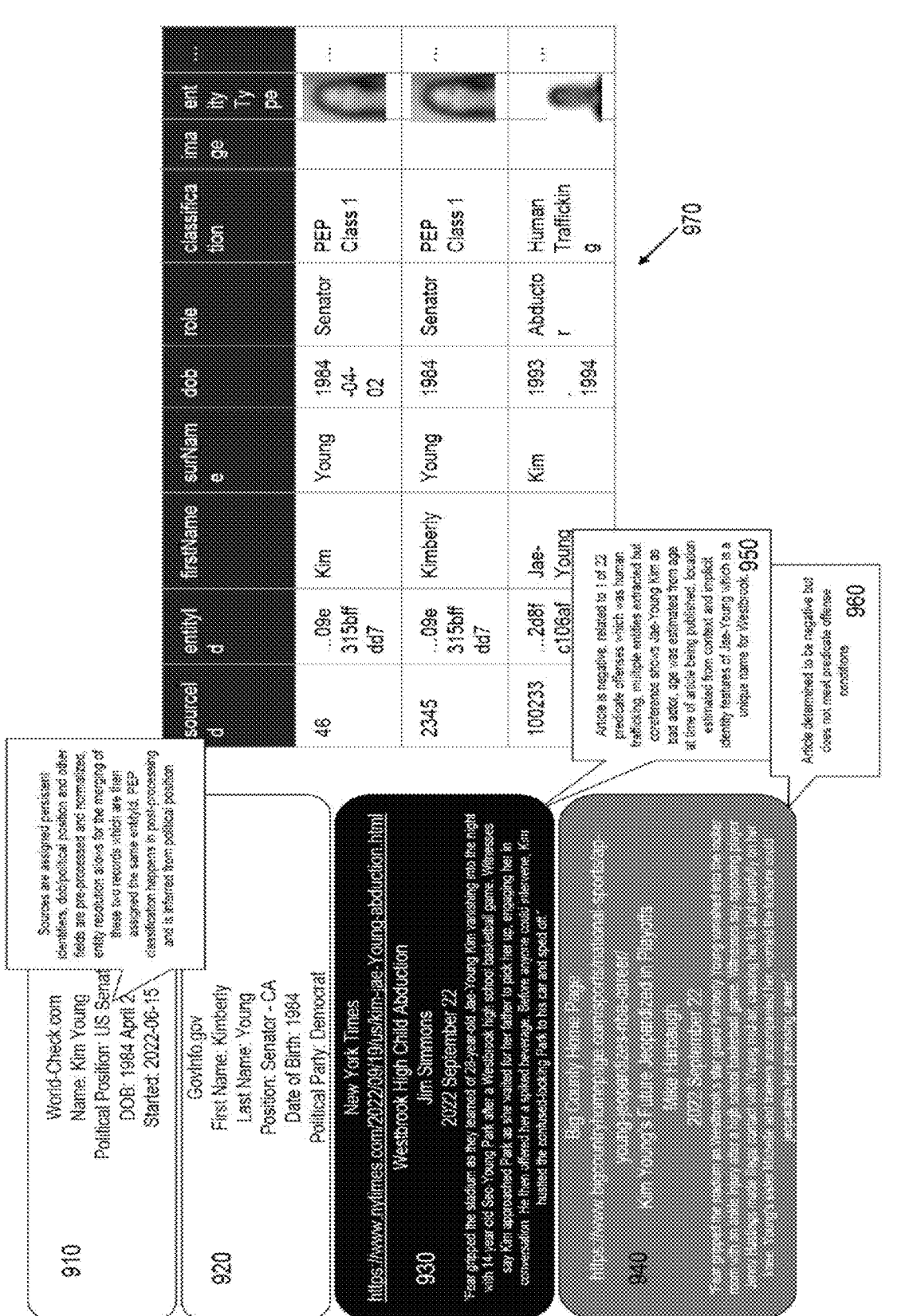
FIG. 9 illustrates a conceptual diagram of organizing one or more AID relative to a collective identity when determining watchlist tags.

In referring to FIG. 9, there is illustrated a conceptual diagram of organizing one or more AID relative to determining watchlist tags for a TA based on a corresponding collective identity. For instance, for the TA "Jae Kim" serving as an applicant according to the interface of FIG. 4, WCS 100 may institute the variously shown analyses 910, 920, 930, and 940 on watchlist data and AID to uncover data that may be basis for watchlist tags against which the input "Jae Kim" may be compared. Thus, in accordance with inspection of the watchlist data and AID data processed by WCS 100, it can be appreciated that potential watchlist tags 970 can be discerned as, at least, a first name including "Jae," a surname of "Kim," a DOB of 1993 or 1994, a role of "Abductor," and a crime of "Human Trafficking," together with uncovered facial imaging indicating a tag of male gender. In this regard, WCS 100 can, for instance, confirm the potential tags as listed due to inspection of the watchlist data and AID that has been processed. For example, and with respect to analysis 930, implicit features (see 950) including DOB can be derived relative to stated age of "Jae-Young Kim" and the article publication date of 2022, article sentiment can be characterized as negative for a crime (relative to title of "Westbrook High Child Abduction") that can be mapped to a predicate offense of human trafficking, Kim can be discerned as a male (disqualifying politically exposed person (PEP) Kim in analyses 910, 920) via coreference to article discussion (e.g., "he") and confirmed by facial imaging, and role of "abductor" can be discerned via activity described for Kim. By contrast, analysis 940 can be disregarded by WCS 100 as not available to provide watchlist tags since, at least, its negative sentiment (see 960) does not qualify for a crime corresponding to a predicate offense (i.e., AID is focused on sports).

Figure 10:
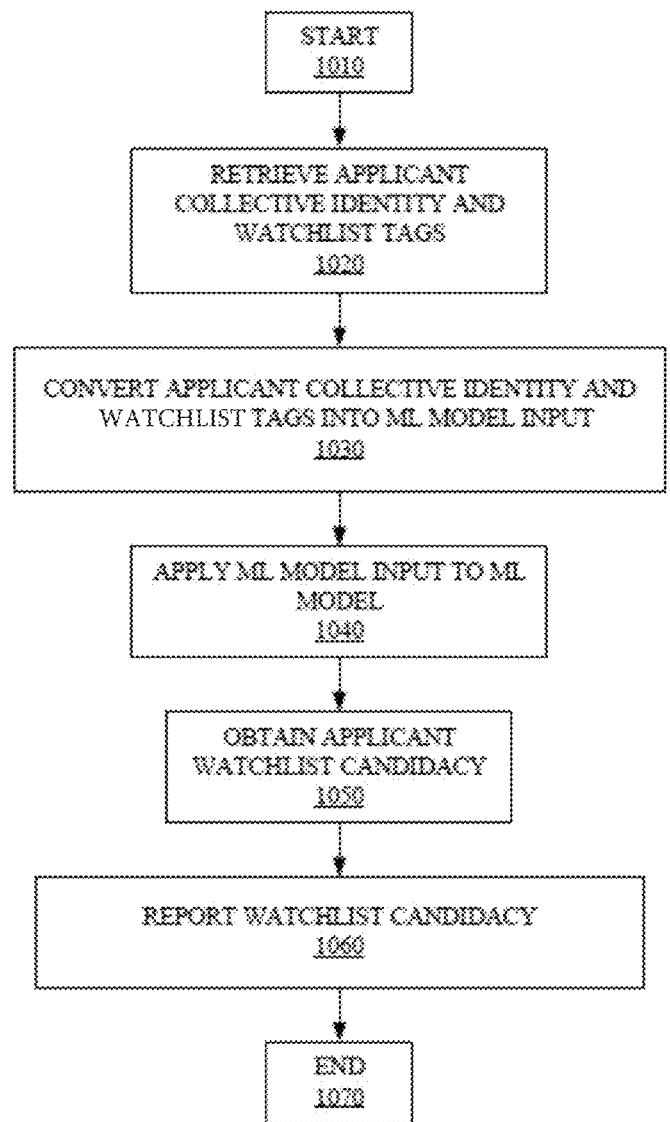
FIG. 10 illustrates a flow diagram for determining a watchlist candidacy using watchlist tags.

Referring to FIG. 10, there is illustrated a process for determining watchlist candidacy using watchlist tags corresponding to a TA where, as discussed herein, the tags express a commonality of identity characteristics between a TA and a WE. The process can begin at 1010 and proceed to 1020 whereat WCS 100 can retrieve a TA's collective identity and watchlist tags determined for that identity. At 1030, WCS 100 can convert the collective identity and the watchlist tags into an ML model input, such as similarly described above in regard to entry into a sparse vector. At 1040, WCS 100 can apply the input to a ML model. Here, the model can be trained with supervised learning and use training data that can be obtained from a history of TA collective identities and corresponding watchlist tags. More specifically, each item of the training data can include an instance of a prior TA collective identity matched to one or more watchlist tags. The matching can be performed according to a predetermined algorithm configured to receive TA identity characteristics from a historical record and pair it with results of watchlist feature generation for the record, such as whether a collective identity provoked AID sentiment triggering classification to a predicate offense. For example, prior records can show and/or describe instances of whether a TA engaged in a predicate offense, etc. During the model training, a representation of the collective identity (e.g., histograms of facial images, values representing PII, etc.) can be provided to the model (e.g., each as an element of a vector). Then, the output from the model, i.e., predicted watchlist candidacy, can be compared to the actual matched watchlist candidacy corresponding to a collective identity and, based on the comparison, the model can be modified, such as by changing weights between nodes of the neural network or parameters of the functions used at each node in the neural network (e.g., applying a loss function). After applying each of the pairings of the inputs (collective identities) and the desired outputs (watchlist features representing watchlist candidacy as derived according to, at least, comparison for watchlist tags as discussed herein) in the training data and modifying the model in this manner, the model is trained to evaluate new instances of TA collective identity in order to determine watchlist candidacy for a new TA.

At 1050, WCS 100 can obtain a TA's candidacy which, as discussed above, may be expressed as probability that the TA is or is not a match to a current WE. The candidacy can be a function of the model's application of predetermined weightings for sourcing of watchlist data and AID. For instance, government issued data may be weighted more heavily than that provided by the private sector. In another instance, matching for tags relative to collective identities may be a function of weighting different PII portions of a collective identity (e.g., name, DOB, gender, ethnicity, etc.) differently such that, for instance and non-exhaustively, name is weighted more heavily than is gender. At 1060, and prior to ending operations at 1070, WCS 100 can report the watchlist candidacy (any applicable reason codes) to a requester implementing a client 195 as in FIG. 1. As part of the reporting, WCS can, in some implementations, receive feedback as to whether the candidacy is believed to be correct based on, for example, the requester's own knowledge of the TA. Should, for instance, the feedback contravene the reported candidacy, WCS 100 can evaluate the feedback according to predetermined cleansing and/or clustering to determine whether the feedback can be trusted sufficiently to warrant updating of the model in 1040.

For example, labels pointing out the same type of prediction error may be grouped together. Such grouping assists in identifying any existing systematic gaps in the modeling performed according to the WCS 100. Clustering can be performed using algorithms such as K-means, hierarchical clustering, etc. Useful dimensions to cluster on may include type of error, data subsets, model confidence, prediction similarity, etc. Feedback labels that do not fit well into any cluster may be set aside for manual review by the WCS 100. In this regard, a human examines these outliers to understand if any common themes exist. Outliers may indicate unusual model failures or rare data subsets. If new types of systematic errors are identified, new clusters can be formed. Otherwise, the outlier labels remain unclustered and still remain valuable as individual feedback. As will be appreciated, the clusters and outliers provide insight into model limitations that can drive iterative feature engineering to address gaps in model design. For example, such engineering may include adding features to better detect subgroups of data for which model performance was not optimal. The improved model is then deployed, generating opportunity for new feedback, and the loop continues. In one or more instances, the model may be updated in various respects (e.g., model parameters such as assigned weightings); if not, model parameters (such as assigned weightings) are maintained. It will be readily understood to one of skill in the art that the features discussed in the present embodiments are merely exemplary and many other features could be used in connection with the teachings of the present disclosure without departing from the scope or spirit thereof.

Figure 10A:
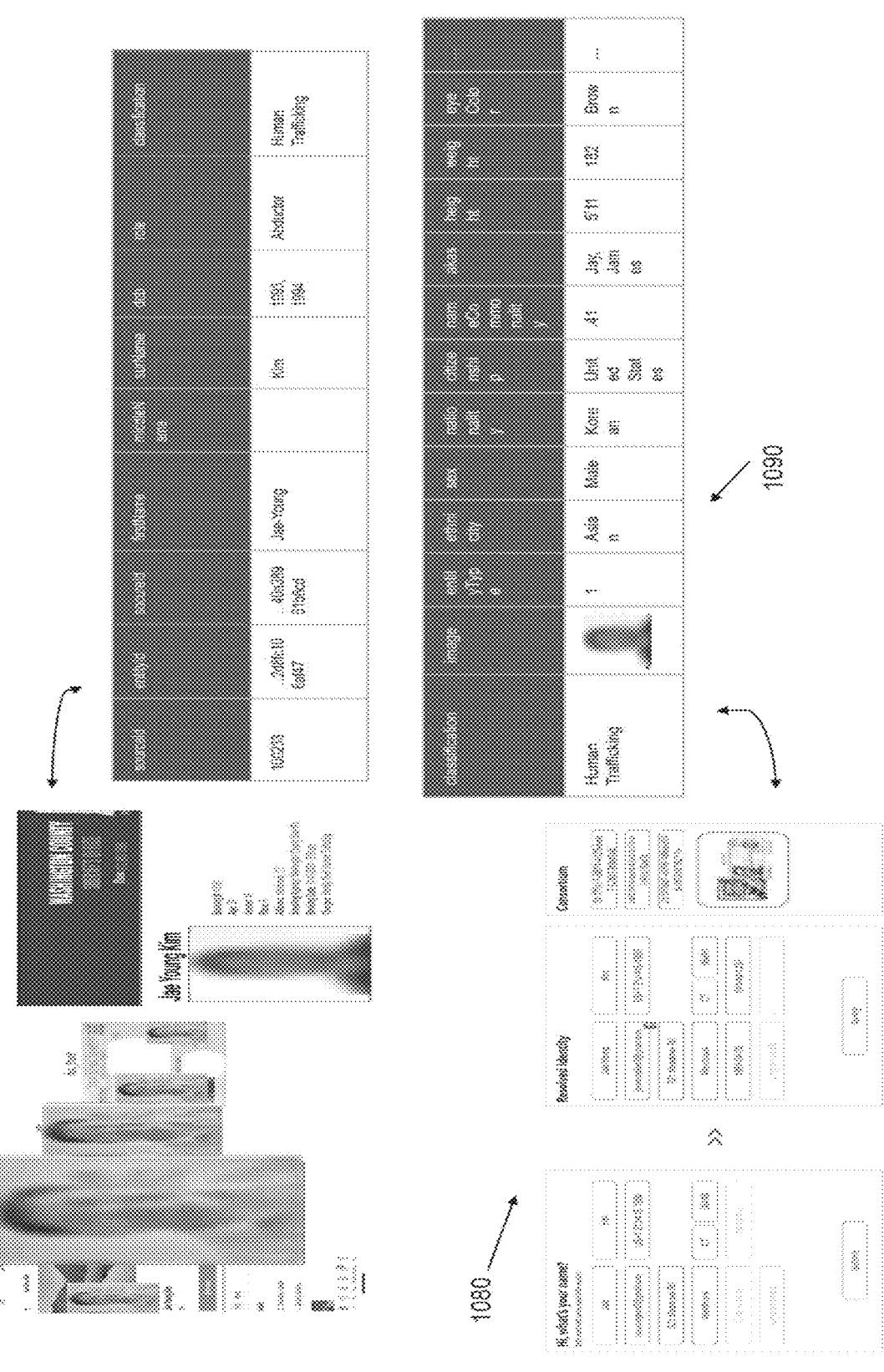
FIG. 10A illustrates a conceptual diagram demonstrating a comparison, for collective identities, that informs a watchlist candidacy.

Referring to FIG. 10A, there is illustrated a conceptual diagram demonstrating a comparison, for collective identities, that informs a watchlist candidacy as may be determined according to FIG. 10. That is, as has been learned from the discussion above, WCS 100 may build one or more collective identities respectively corresponding to both a TA and a WE. Here, the comparison(s) 1080, 1090 of the TA Jae Young Kim, born in 1983, between WE Jae Young Kim, born in 1993, buttressed by facial imaging confirming the age discrepancy, yields the result that, though other identity characteristics (e.g., name, ethnicity, residence city, gender, etc.) match, that TA Kim is, because of the age discrepancy, unlikely to be a WE in this instance of comparison. Thus, it will appreciated based on the discussions herein that, because of the derivations of the example collective identities as informed by their incumbent implicit features derived from AID, that determined watchlist tags can serve to optimize one-to-one-comparison for identity characteristics on which watchlist candidacy may be grounded.

Figure 11:
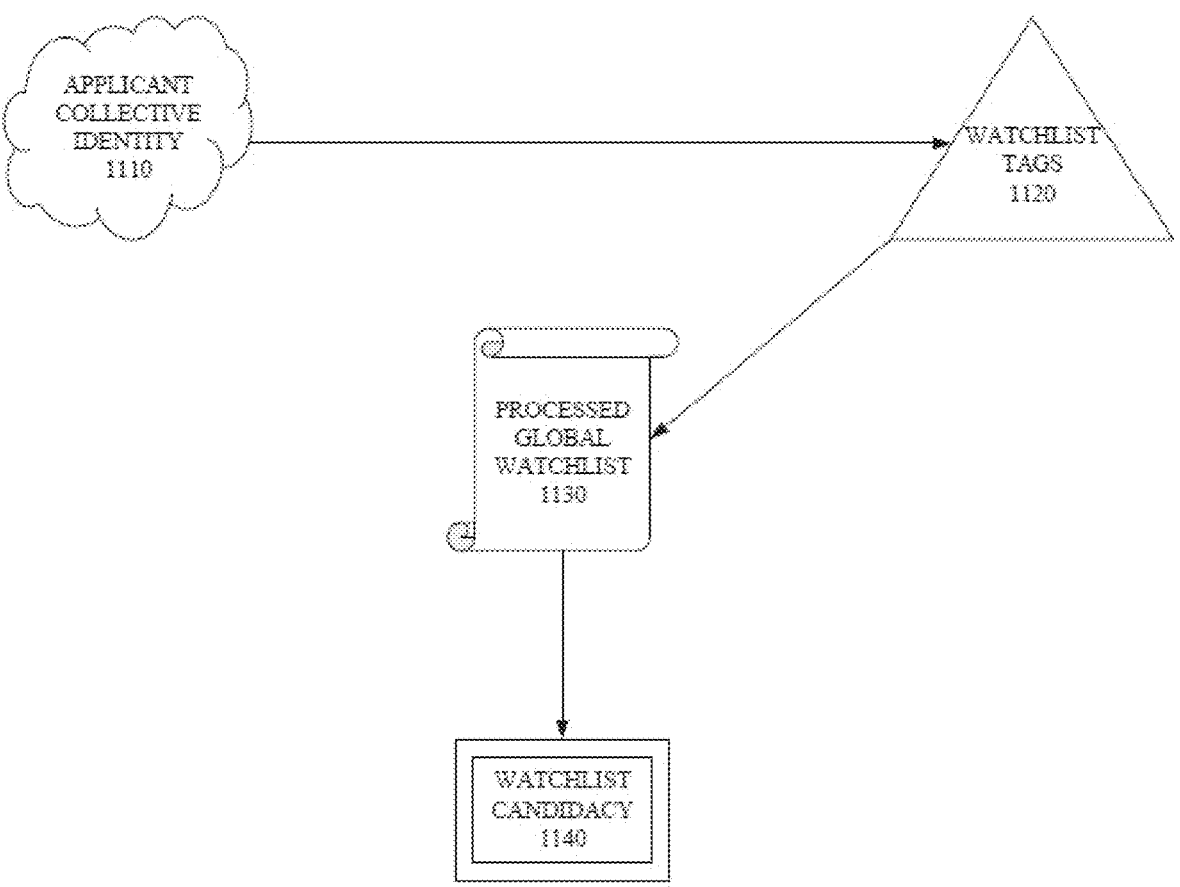
FIG. 11 illustrates a high-level conceptual diagram demonstrating determination of a watchlist candidacy.

Referring to FIG. 11, there is illustrated a conceptual diagram, in accordance with at least FIGS. 7-8 and 10, for determining a watchlist candidacy. In these regards, WCS 100 can retrieve identity characteristics for one or more of a TA and a WE so as to arrive at a respective collective identity 1110. Using these identities, WCS 100 can determine watchlist tags 1120 which can be constructed using identity characteristics for the identities according to, for instance, FIG. 7. In other words, each of such tags can be a matrix of collected or aggregated identity characteristics (e.g., [name, residence; DOB, social media participation; social media participation, geolocation]). Once the tags are ascertained, comparison for a TA whose identity corresponds to the tags can be made against processed global watchlist data 1130 compiled by WCS 100 as described herein. Using this comparison, a watchlist candidacy for a TA can be determined (see, e.g., FIG. 10).

In these ways, and in view of the entirety of the discussions presented hereinabove, it can be understood that WCS 100 does not merely conduct screening for watchlist data, but uses that data to find, in real time and for continually received data, new connections and associations for TAs and WEs that are distilled to logical components in order to more accurately define a watchlist candidacy.

Figure 12:
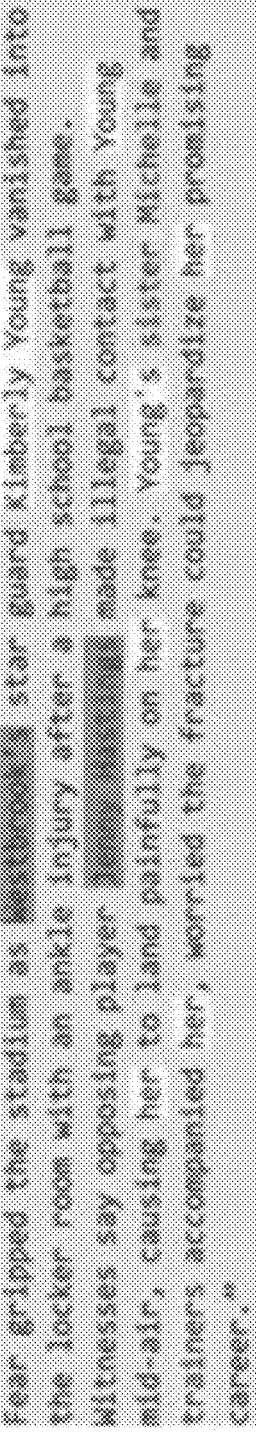
FIG. 12 illustrates two exemplary snippets from news articles demonstrating the use of NLP to extract features associated with identities.
Figure 13:
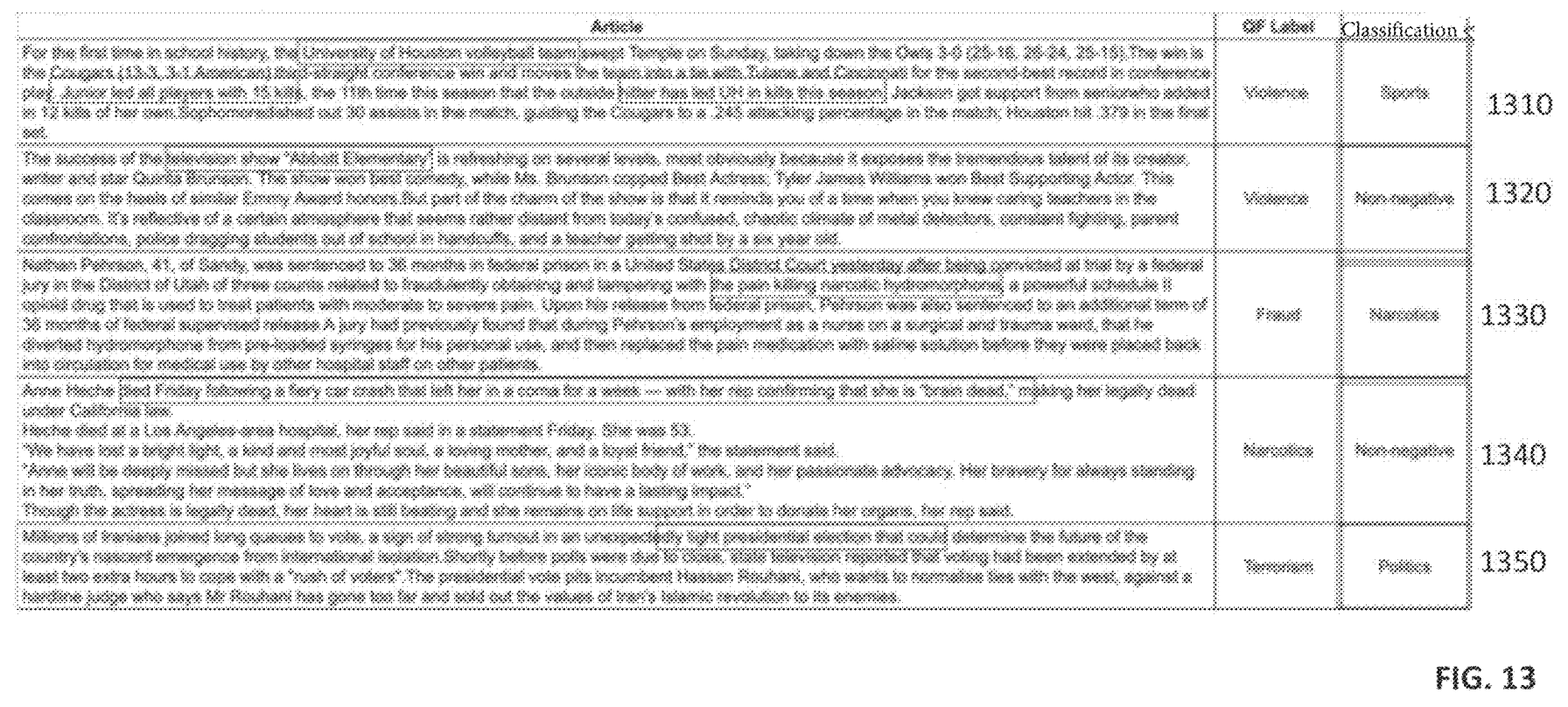
Figure 14:
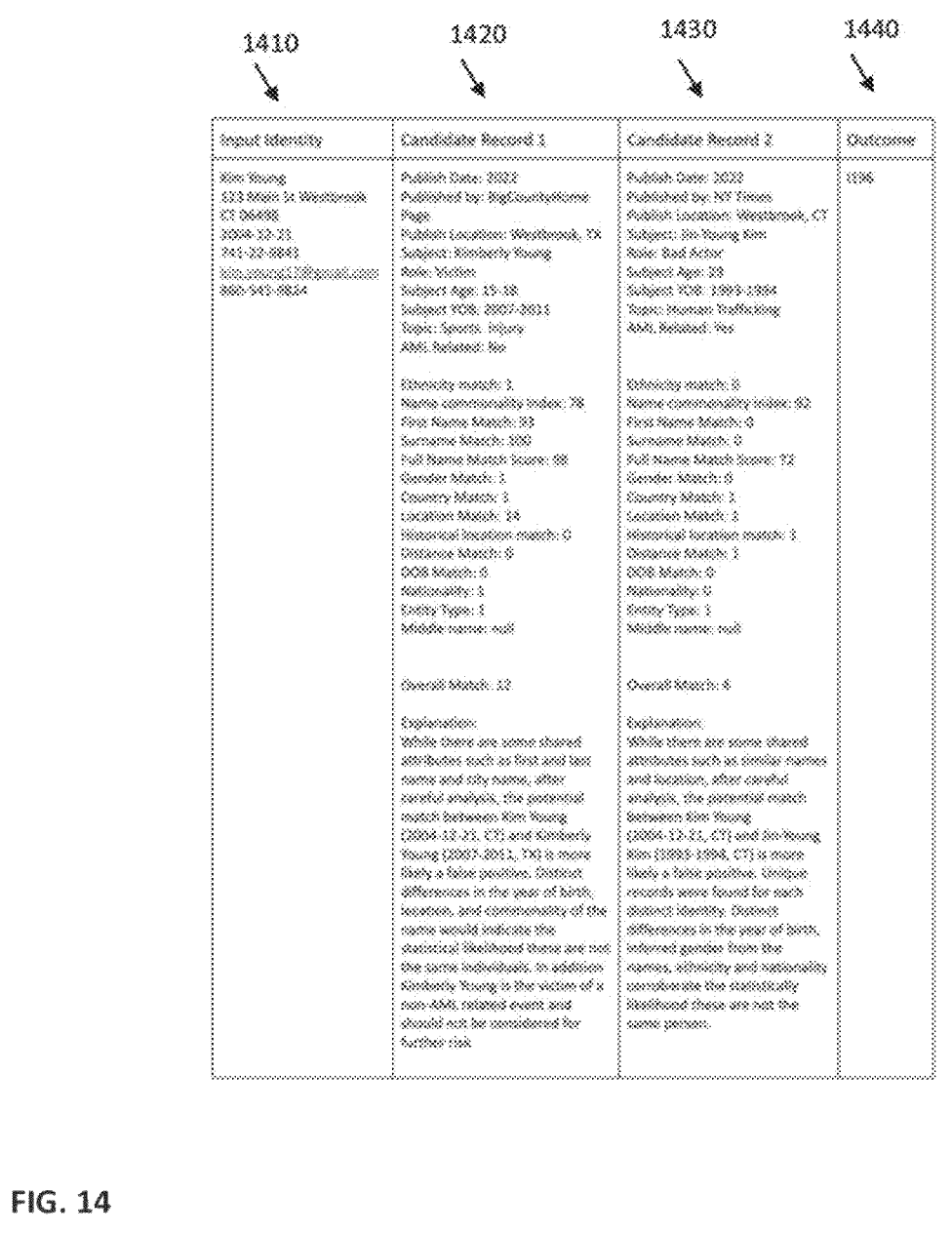

With reference now to FIGS. 12, 13 and 14, a discussion of the novel aspects of the present embodiments relating to the use of textual information to form and/or supplement aggregated identities and collective identities is provided. In this way, various content comprising news articles, social media postings, web based search results, publications, information releases and a myriad of other types of content can be used to obtain additional information associated with identities in order to make more accurate assessments as to the probability of a TA matching a WE entity. According to one or more of various embodiments herein, the sourced textual content may be publicly available via such sources as the world wide web, social media postings, press releases, etc. Alternatively, the textual content may be obtained from a non-public source such as private databases and information sources including those requiring payment in order to obtain access to the content.

According to the teachings of the present embodiments, textual content is parsed using natural language processing techniques in order to ascertain information regarding individuals in order to supplement one or more features available in connection with collective identities and aggregated identities. With specific reference now to FIG. 12, two separate snippets of textual information 1210 and 1220 are shown. For exemplary purposes, each of these text samples may have been retrieved from a publicly available news article although the content could have been sourced from any publicly or privately available data source.

With reference to snippet 1210, data ingester 120 may ingest snippet 1210 which is then processed by watchlist analyzer 110 in order to create or supplement one or more records in aggregated identity base 175. The features extracted from snippet 1210 may be used to add or update one or more features associated with one or more collective identities or aggregated identities contained within aggregated identity base 175. According to the teachings of the present embodiments, features such as age, ethnicity, gender, location etc. may be extracted from the text in snippets such as snippet 1210. But, in addition, additional feature types may also be extracted and used in connection with WE matching determinations. For example, with respect to an individual referenced in a snippet, the system as disclosed herein may attempt to determine features such as: participation in criminal history, type of criminal activity, status as an actor or victim with respect to a criminal act as well as other features related to events described in textual content such as news articles, social media postings and the like.

With respect to snippet 1210, feature extraction may operate such that "Kimberly Young" is identified as the subject of the news article referenced as 940 in FIG. 9. The term "Westbrook" may be determined to be the location of a high school in Texas based on the fact that snippet 1210 was sourced from a publication known a "Big Country Home Page" which is known to provide news in the geographical region including Westbrook, TX. Also, the subject identity "Kimberly Young" may also be determined to be of a female gender based on the words "her" noted in snippet 1210 and referencing "Kimberly Young". The approximate DOB for "Kimberly Young" may also be determined to be within the range of between 2007 and 2011 based on the date of the article and the determination that "Kimberly Young" was a participant in a high school basketball game around the time of the article publication.

There are various other features that can be extracted from snippet 1210 based on the content. For example, a feature addressing familial relationships for "Kimberly Young" could be populated with "Michelle" as a sister based on the text in snippet 1210. Additionally, even though snippet 1210 references "vanished", "illegal" and "witnesses", the system herein, through the use of machine learning and the other contextual information in snippet 1210, will not attribute any criminal related feature to the subject "Kimberly Young" (i.e. the aggregated identity and/or the collective identities will not include a feature aligning her with an actor in any criminal activity based on snippet 1210 alone). Various other data features including, for example, some which are associated with "Jenny Hastings" who is also mentioned in snippet 1210 could also be extracted in accordance with the teachings of the present disclosure.

As discussed above with respect to 960 in FIG. 9, the system of the present disclosure has determined that although snippet 1210 comes from an article viewed as negative, there is not content suggesting that a crime is involved much less a specific predicate offense, so, in such case, none of the referenced identities would be supplemented with a positive tag for a predicate offense.

Snippet 1220 in FIG. 12 is another example of textual content that might be parsed by the system of the present disclosure in respect of adding, supplementing and/or changing watchlist tags associated with one or more identities. Snippet 1220 is sourced from article 930 as shown in FIG. 9. In this case, the referenced subject "Jin-Young Kim" may be associated with the same "Jae-Young Kim" referenced in FIGS. 6, 9 and 10A based on available alias information as well as other, alternative matching features for the identity. In this case, parsing of snippet 1220 is indicative of "Jae-Young Kim" being an actor in a crime and "Seo-Young Park" being a victim of that crime. The system of the present disclosure will determine that article 930 is negative and that the offense tied to "Jae-Young Kim" is human trafficking which is one of the predicate offenses tied to money laundering (see, e.g. offenses denoted by the FATF). Further discussion of the extraction of information associated with snippet 1220 is provided above in connection with FIG. 9.

The system of the present embodiments may use various natural language processing (NLP) techniques in order to parse textual content as described above. These techniques may include the use of various linguistic models, feature extraction methodologies and text pre-processing steps. According to some embodiments, large language models (LLMs) and transformer architectures such as, for example, BERT, GPT and/or XLNet may be employed. In some embodiments, these models can be pre-trained on massive text corpora to build robust linguistic representations that can be implemented and customized for specific tasks.

With respect to feature extraction in connection with the parsing of textual content, various techniques may be used according to various embodiments of the present disclosure. For example, named entity recognition may be used to identify and classify entities like people, organizations, locations from the text. This uses sequence labeling models like conditional random fields or neural architectures. Relation extraction may be used to determine relationships between entities, like who is the subject and/or object of an article and what roles they play. This may use dependency parsing or attention mechanisms from the language model.

Sentiment analysis classifiers, which are fine-tuned from the main language model, can be used to gauge positive/negative polarity around potential crimes or offenses mentioned. Additionally, coreference resolution may be used to cluster expressions referring to the same real-world entity. This aspect is very important for tracking identities across a document.

The system of the present embodiments may also implement text pre-processing techniques. This may include steps such as tokenization and stop word removal. Some word stemming and lemmatization may be used alongside contextualized entity normalization to detect concepts like the name "Kimberly Young" referring to the same identity across variations. The system may also employ domain-specific precedence rules and knowledge bases associated with catalogs of predicate offenses, geographic areas, identity attributes which are being sought.

With reference now to FIG. 13, there is shown a table listing snippets from various articles (represented by rows 1310-1350) along with possible labels that could be applied to those articles based upon a read of the content in the article snippets. In connection with one or more embodiments herein, it is desirable to classify articles and snippets in connection with their use in developing additional features and watchlist tags which are included in collective identities and aggregated identities as discussed herein. In so doing, some snippets may be disqualified initially as not being relevant to an assessment of watchlist matching. For example, with proper classification as "sports" and "nonnegative" respectively for articles 1310 and 1320 rather than "violence", these snippets/articles can immediately be removed from use in connection with the development of features and tags as discussed above. By eliminating this content from usage, the system of the present disclosure functions in a more efficient manner and is more likely to eliminate false positive results resulting in a better user experience.

In practical operation, the system of the present disclosure employs NLP capabilities to parse snippets in order to perform the classification task. In the case of article 1310, the system can recognize that the article is about a volleyball match and should be classified as "sports" notwithstanding the inclusion of terms such as "kills". Using machine learning and feedback following classification operations, the system herein can continually improve its ability to correctly classify articles/snippets used in connection with feature development associated with collective identities and aggregate identities.

In the case of snippet 1330, the system of the present disclosure classifies the snippet as relating to narcotics which may tie to one or more predicate offenses (e.g. drug trafficking). As such, snippet 1330 will be deemed to be significantly relevant to watchlist determinations and the features extracted from this article will typically be used in order to supplement collective identities and aggregate identities with additional features and tags as applicable. In the case of snippet 1330, it is likely that the collective identities and aggregate identities associated with the subject "Nathan Peterson" that is around 41 years of age around the time of the article publication will be supplemented with a watchlist tag relating to a predicate offense which would disqualify that identity from many financial transactions. Snippets 1340 and 1350 demonstrate the same type of classification as has been discussed above and as is shown in FIG. 13.

With reference now to FIG. 14, a discussion regarding processes and techniques employed by the system herein, in one or more embodiments thereof, in connection with the matching of identities, is now provided. As can be seen in FIG. 14, the table includes four columns. The first column 1410 includes information available to WCS 100 regarding a TA. In this case, an address, phone number, social security number, email address and phone number for TA identity "Kim Young" is available and exemplifies one possible collective identity constructed for this TA according to the discussion above.

Column 1420 represents one candidate record representing one portion of an aggregated identity to be tested for a match as against the collective identity constructed for the TA in column 1410. Column 1420 which represents "Candidate Record 1" includes information obtained from NLP processing as described above in connection with snippet 1210 in FIG. 12. As discussed above, snippet 1210 is sourced from an article published in BigCountryHome which serves an area including Westbrook, TX. This article has been classified as sports related and other information regarding the subject "Kimberly Young" has been extracted from snippet 1210 and included within the portion of the aggregate identity for Kimberly Young identified as Candidate Record 1 in column 1420. This information includes her role (victim of sports injury), her age range, her year of birth range and whether she is identified from this source as being tied to any anti-money laundering ("AML") related predicate offenses (in this example, no).

Additional information in column 1420 is indicative of the matching parameters as to whether the input identity in 1410 is likely a match for candidate record 1 in 1420. For example, matching parameters such as ethnicity, name commonality, first and last name, gender, country, location, DOB, entity type and other features may be assessed as to likelihood of a match. In some embodiments, an overall match score (for example 12 of out 100 in this case) is provided representing the likelihood of a match between the input identity and the candidate record. In some embodiments, an explanation supporting the overall match score may also be provided. Natural language processing may be used to automate the textual information provided by WCS 100 to client 195 to enable decision making. As seen in this case, the relatively low matching score is supported because of differences in birthdates and locations as well as the commonality of the name.

Column 1430 represents another record which may be assessed for a match against the TA identified in 1410. In this case, the record includes information sourced from snippet 1220 in FIG. 12. This candidate record includes a publication date and publisher name for the article as well as the classification and location of the article, the subject of the article and the role of the subject in the article. It also includes the subject's age, year of birth range and the fact that the subject has been tied to an AML predicate offense. For this record, the matching as against the TA features is lacking in terms of ethnicity, name commonality, name (Jin-Young Kim vs Kim Young) as well as in other features resulting in a low matching score of 4. Again, textual information for the matching score may be provided as shown in FIG. 14. Column 1440 represents a final outcome code that may be reported to client 175 indicative of a recommendation based on match scoring along with a standardized reason code to assist a client in final determinations as to whether to allow a transaction to proceed or not.

Additional discussion regarding the processes of the present disclosure, particularly including exemplary processes associated with input data, feature vectors and model outputs, is now provided. Assume the following news article snippet is available:

"Jin-Young Kim, a 29-year-old South Korean national, was arrested yesterday in Austin, Texas for suspected involvement in a human trafficking ring. Reports indicate Kim lured and abducted multiple victims, including 21-year-old Seo-Young Park, transporting them across state lines . . . ."

The following steps may be implemented by the system of the present disclosure (not necessarily in the order stated below which is merely an example):

Exemplary Step 1—the NLP pipeline may apply tokenization to generate the following:

["Jin-Young", "Kim", ",", "29-year-old", "South", "Korean", "national", . . . ]

Exemplary Step 2—named entity recognition may be applied so as to locate the Person Name "Jin-Young Kim", classify "Austin, Texas" as a location and classify "South Korean" as a Nationality.

Exemplary Step 3—Apply relation extraction to identify "Jin-Young Kim" as the Subject performing the verb "arrested" for the crime "human trafficking" The system may also detect "Seo-Young Park" as the Object victim related to "abducted".

Exemplary Step 4—Encode the foregoing into rich feature vectors such as:

["Jin-Young_Kim", 29: subject: human_trafficking: abduction, "Seo-Young_Park": object, . . . ]

Exemplary Step 5 Apply an unsupervised clustering model, which might group this example into a cluster for:

[middle_aged_male, korean, human_trafficking, abductor]

Exemplary Step 6—Classify and output the following watchlist tags based on the foregoing cluster assignment:

[age=30s, nationality=korean, crime=human_trafficking, role=perpetrator]

Exemplary Step 7—Union this watchlist tag representation with raw features about "Jin-Young Kim" and pass into supervised candidacy model. Assuming a match with an existing watchlist entity, the following probability output may be generated:

watchlist_candidacy("Jin-Young Kim")=0.95

In some embodiments, supporting evidence such as the following may be provided with the stated probability:

"Matches South Korean national Jin Young Kim, age 29, with suspected involvement in human trafficking crimes targeting Seo-Young Park according to reports from Austin, Texas."

It will be recognized by one of skill in the art that the system and methodologies disclosed herein can be applied in various contexts. For example, it is possible to implement the systems and methodologies of the present disclosure in connection with transaction requests as they are presented to the system in connection with decision making (i.e. as TAs are considered for watchlist candidacy in connection with these TAs seeking to process transactions). It is also possible for the systems and methodologies of the present disclosure to be implemented in connection with monitoring services and related applications. In this case, specific individuals and/or sets of individuals may be monitored over time with respect to their identities being added to a watchlist or similar database. Aggregated identities and collective identities and the leveraging thereof as described herein may also be applied in the context of such monitoring services and/or applications.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method of developing collective identity data in connection with determining watchlist candidacy associated with a transaction applicant (TA), the method comprising;

receiving identity characteristics corresponding to said TA;

receiving textual content continually in real time;

invoking a natural language processing process to parse said textual content to detect at least (x) a correspondence between said textual content and said TA and (xi) a sentiment of said textual content corresponding to at least one financial crime respectively corresponding to at least one predicate offense involvement, in which said at least one predicate offense involvement is predetermined from among a plurality of predicate offense involvements;

extracting from said textual content, in response to a detection of at least (x) and (xi), at least one tag associated with a feature and corresponding to said TA, wherein said at least one tag associated with a feature and corresponding to said TA corresponds to at least one feature associated with an identity of a watchlist entity (WE) on a watchlist, that is shared with said feature associated with said TA and comprises, at least, said at least one predicate offense involvement, wherein said extracting said at least one tag in response to said detection of at least (x) is performed in accordance with a predetermine x assign to said feature corresponding to said TA, such that or more features not in satisfaction of said predetermined weighting are assigned a weighting of lesser magnitude than said predetermined weighting for said extracting and wherein said extracting said at least one tag in response to said detection of at least (x) is performed in accordance with determination of at least a predetermined role for said at least one financial crime respectively corresponding to said at least one predicate offense involvement;

modifying said collective identity data associated with said TA to include said at least one tag associated with a feature and corresponding to said TA, wherein said modifying is in response to one or more of said at least one tag associated with a feature and corresponding to said TA indicating said at least one predicate offense involvement; and determining watchlist candidacy employing said modified collective identity data, wherein said determining is in response to said watchlist candidacy comprising a probability that said modified collective identity data of said TA matches said identity of said WE.

2. The method of claim 1 wherein:

the identity characteristics corresponding to said TA comprise one or more of (a) name, (b) ethnicity, (c) date of birth, (d) residence address, (e) email address, (f) gender, (g) national identification, (h) geolocation data, (i) one or more of said at least one predicate offense involvement or (j) any combination thereof.

3. The method of claim 1, wherein:

said at least one tag associated with a feature and corresponding to said TA comprises one or more of (k) name, (l) ethnicity, (m) date of birth, (n) residence address, (o) email address, (p) gender, (q) national identification, (r) geolocation data, (s) one or more of said at least one predicate offense involvement or (t) any combination thereof.

4. The method of claim 1, wherein:

said textual content comprises content sourced from news articles.

5. The method of claim 1, wherein:

said textual content comprises content sourced from a social media platform.

6. The method of claim 1, further comprising:

reporting the watchlist candidacy to a requester thereof;

receiving feedback on the reported watchlist candidacy;

determining whether the feedback is accurate according to the collective identity of the TA;

based on the determining, updating at least a machine learning model which assesses watchlist candidacy.

7. A computing system for developing collective identity data in connection with determining watchlist candidacy associated with a transaction applicant (TA), the computing system comprising:

one or more processors; and one or more memories storing instructions that, when executed by the one or more processors, cause the computing system to perform a process comprising:

receiving identity characteristics corresponding to said TA;

receiving textual content continually in real time;

invoking a natural language processing process to parse said textual content to detect at least (x) a correspondence between said textual content and said TA and (xi) a sentiment of said textual content corresponding to at least one predicate offense involvement;

extracting from said textual content, in response to a detection of at least (x) and (xi), at least one tag associated with a feature and corresponding to said TA;

modifying said collective identity data associated with said TA to include said at least one tag associated with a feature and corresponding to said TA, wherein said modifying is in response to one or more of said at least one tag associated with a feature and corresponding to said TA indicating said at least one predicate offense involvement; and determining watchlist candidacy employing said modified collective identity data.

8. The computing system of claim 7, wherein:

the identity characteristics corresponding to said TA comprise one or more of (a) name, (b) ethnicity, (c) date of birth, (d) residence address, (e) email address, (f) gender, (g) national identification, (h) geolocation data, (i) one or more of said at least one predicate offense involvement or (j) any combination thereof.

9. The computing system of claim 7, wherein:

said at least one tag associated with a feature and corresponding to said TA comprises one or more of (k) name, (l) ethnicity, (m) date of birth, (n) residence address, (o) email address, (p) gender, (q) national identification, (r) geolocation data, (s) one or more of said at least one predicate offense involvement or (t) any combination thereof.

10. The computing system of claim 7, wherein:

said textual content comprises content sourced from news articles.

11. The computing system of claim 7, wherein:

said textual content comprises content sourced from a social media platform.

12. The computing system of claim 7, wherein the process further comprises:

reporting the watchlist candidacy to a requester thereof;

receiving feedback on the reported watchlist candidacy;

determining whether the feedback is accurate according to the collective identity of the TA;

based on the determining, updating at least a machine learning model which assesses watchlist candidacy.

* * * * *